(12) United States Patent
Sano

(10) Patent No.: US 10,545,359 B2
(45) Date of Patent: Jan. 28, 2020

(54) DISPLAY DEVICE

(71) Applicant: Japan Display Inc., Minato-ku (JP)

(72) Inventor: Takumi Sano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/046,340

(22) Filed: Jul. 26, 2018

(65) Prior Publication Data

US 2019/0033652 A1 Jan. 31, 2019

(30) Foreign Application Priority Data

Jul. 27, 2017 (JP) .................................. 2017-145663

(51) Int. Cl.
*G02F 1/1333* (2006.01)
*G02F 1/1335* (2006.01)

(52) U.S. Cl.
CPC .. *G02F 1/133305* (2013.01); *G02F 1/133512* (2013.01); *G02F 2201/56* (2013.01)

(58) Field of Classification Search
CPC ......... G02F 1/133305; G02F 1/133512; G02F 2201/56; G02F 2201/54
See application file for complete search history.

(56) References Cited

U.S. PATENT DOCUMENTS

| 2011/0007042 | A1* | 1/2011 | Miyaguchi | ........ G02F 1/133305 345/204 |
| 2013/0016308 | A1* | 1/2013 | Urayama | ............ G02F 1/13394 349/61 |
| 2015/0362788 | A1* | 12/2015 | Park | .................. G02F 1/133308 349/58 |
| 2017/0075444 | A1* | 3/2017 | Nade | ...................... G06F 3/041 |
| 2018/0217434 | A1* | 8/2018 | Kawata | ............. G02F 1/133305 |

FOREIGN PATENT DOCUMENTS

| JP | 2004-126197 | 4/2004 |
| JP | 2013-122471 | 6/2013 |
| JP | 2015-226204 | 12/2015 |

\* cited by examiner

*Primary Examiner* — Thanh Nhan P Nguyen
(74) *Attorney, Agent, or Firm* — Oblon, McClelland, Maier & Neustadt, L.L.P.

(57) ABSTRACT

According to one embodiment, there is provided a display device including a first basement having flexibility, a second basement having flexibility and opposed to the first basement, a sealant which attaches the first basement and the second basement to each other, and a first reinforcement film provided on an opposite side to a side of the first basement which is opposed to the second basement, and in a plane view, an edge of the first reinforcement film is located on an inner side from an edge of the sealant.

13 Claims, 9 Drawing Sheets

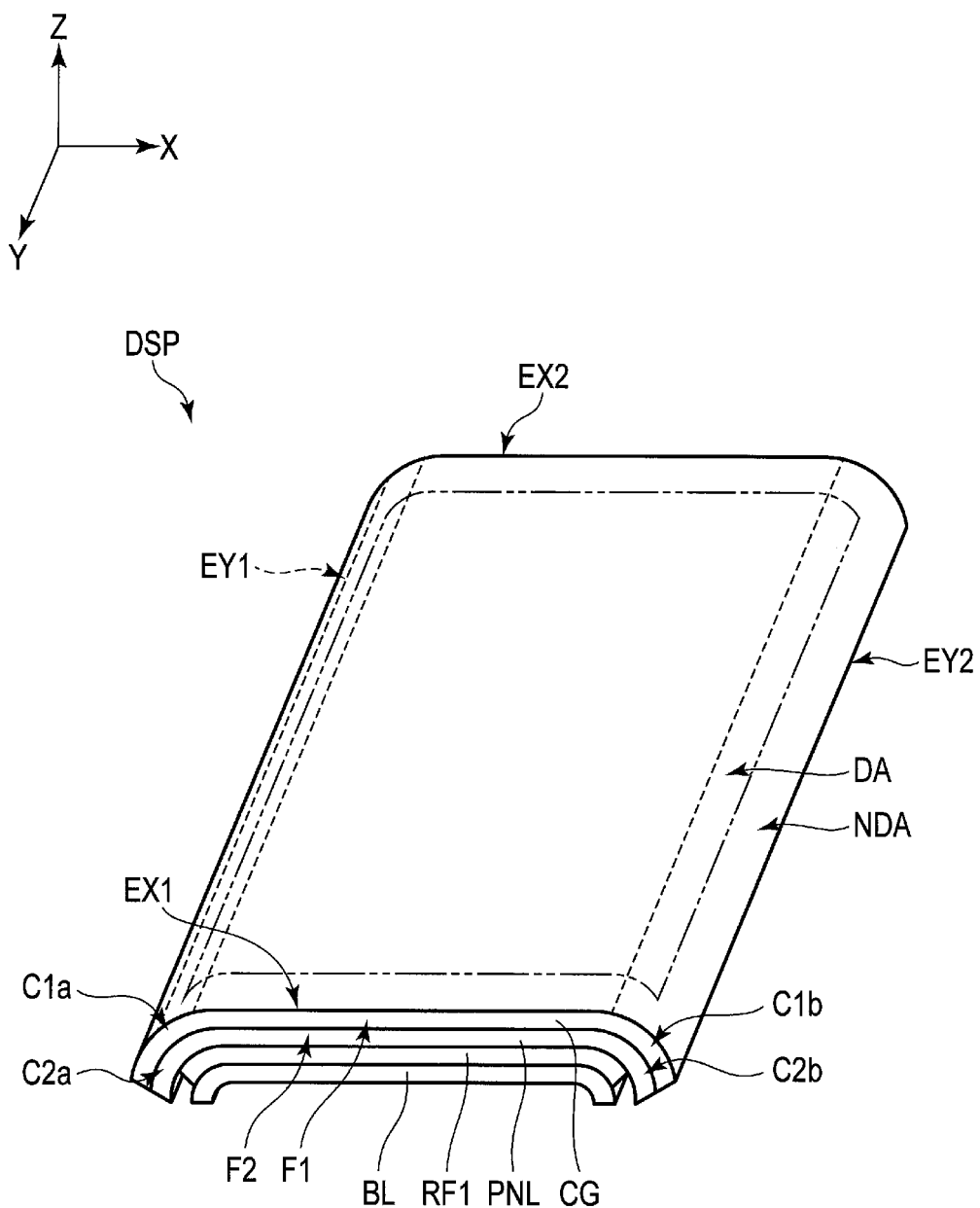
F I G. 1

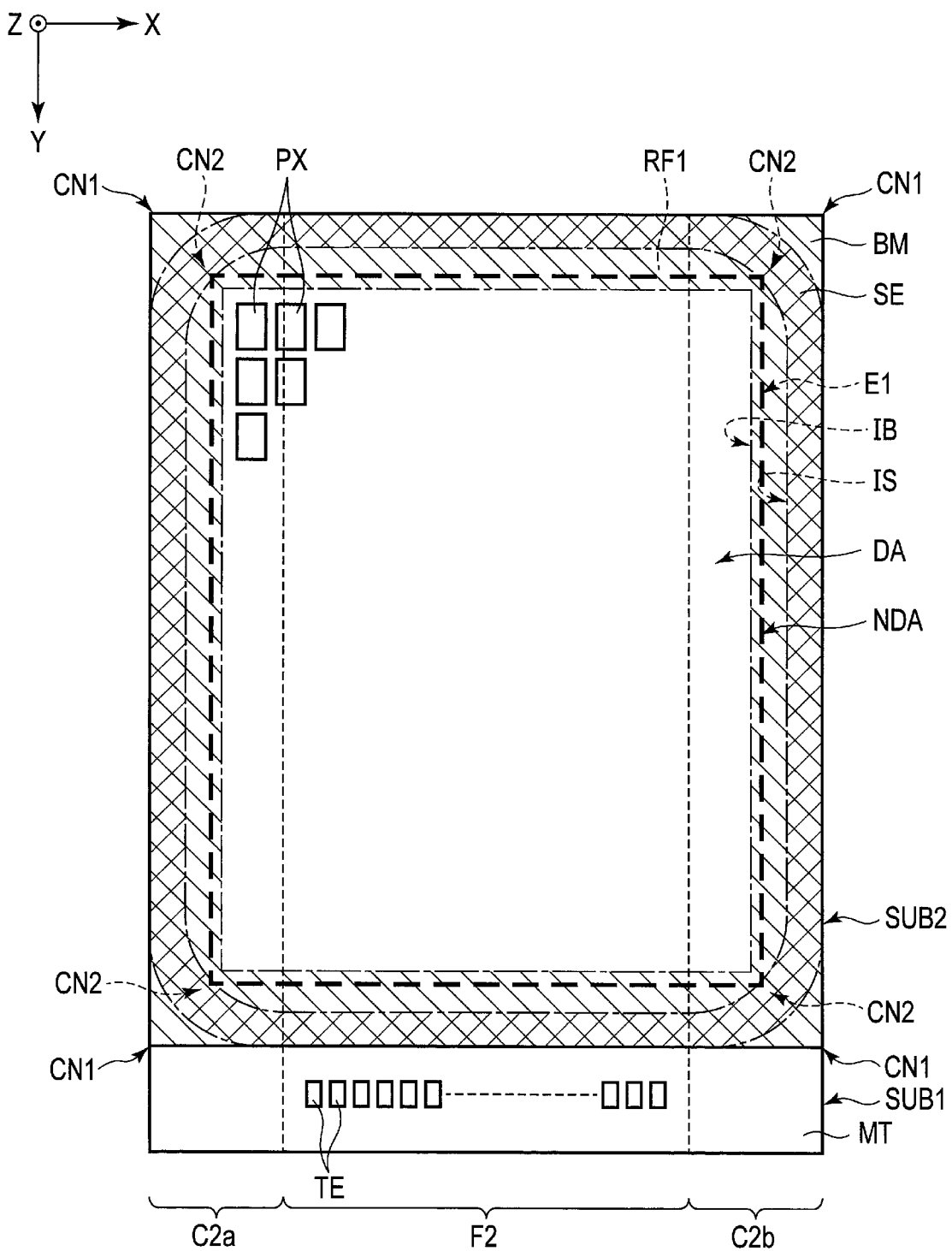
F I G. 5

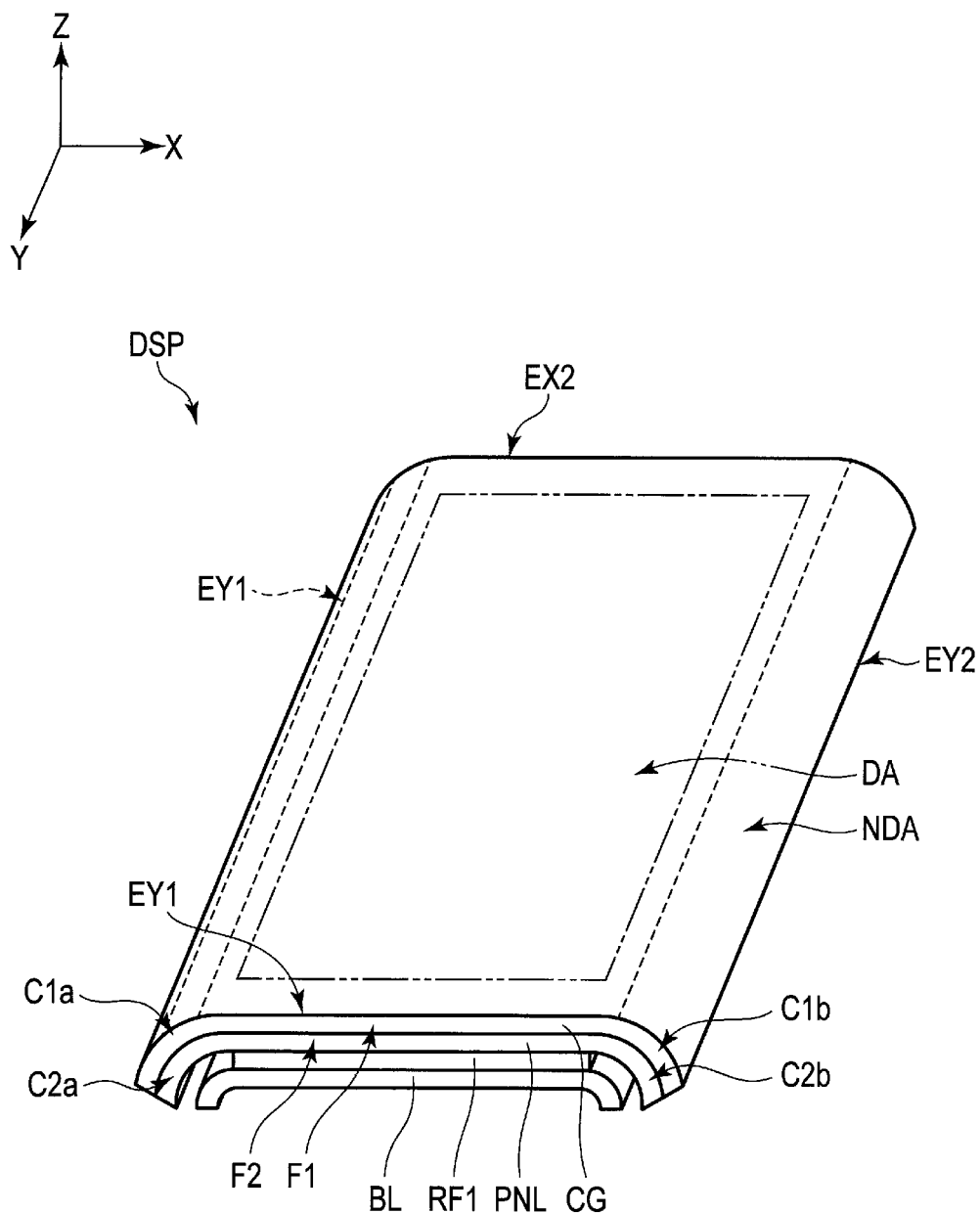
F I G. 7

DISPLAY DEVICE

CROSS-REFERENCE TO RELATED APPLICATIONS

This application is based upon and claims the benefit of priority from Japanese Patent Application No. 2017-145663, filed Jul. 27, 2017, the entire contents of which are incorporated herein by reference.

FIELD

Embodiments described herein relate generally to a display device.

BACKGROUND

In display devices used in cellphones, personal digital assistants (PDAs), etc., there is demand for narrowing frames from the perspective of performance, design, etc. As an example of the trend of narrowing frames, recently, a display device using a flexible display panel and having curved edges have been developed.

In the case of forming a curved display panel, wrinkles may be developed on the display panel. In a display device having a liquid crystal layer, such wrinkles make the thickness of the liquid crystal layer uneven and eventually cause display trouble in some cases.

BRIEF DESCRIPTION OF THE DRAWINGS

FIG. 1 is a perspective view showing an example of the structure of a display device DSP according to the present embodiment.

FIG. 5 is a plan view showing another example of the display device DSP.

FIG. 7 is a perspective view showing another example of the display device DSP.

DETAILED DESCRIPTION

Figure 2:
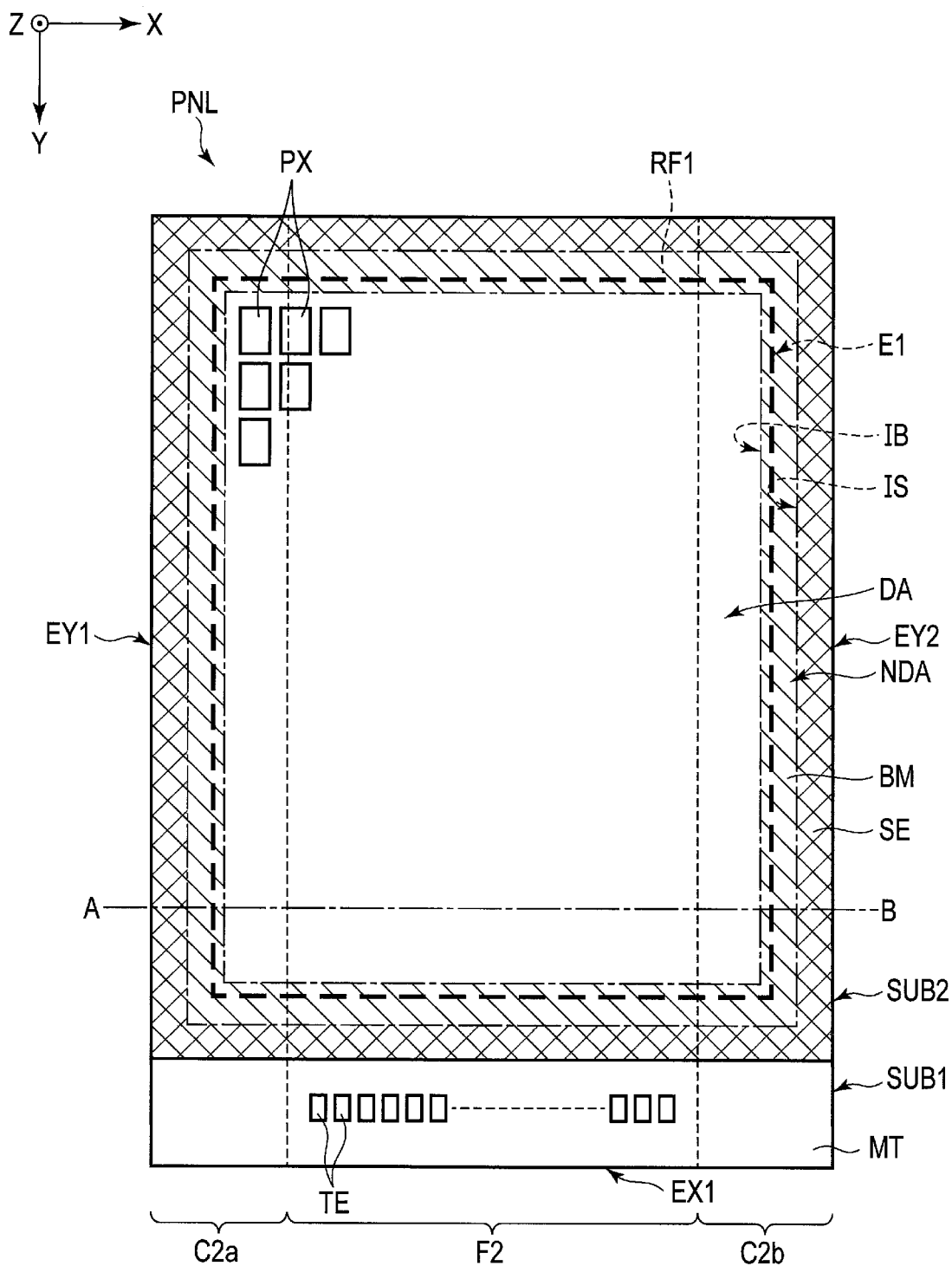
FIG. 2 is a plan view showing an example of the structures of a display panel PNL and a reinforcement film RF1 shown in FIG. 1.

In general, according to one embodiment, there is provided a display device including a first basement having flexibility, a second basement having flexibility and opposed to the first basement, a sealant which attaches the first basement and the second basement to each other, and a first reinforcement film provided on an opposite side to a side of the first basement which is opposed to the second basement, and in a plane view, an edge of the first reinforcement film is located on an inner side from an edge of the sealant.

According to another embodiment, there is provided a display device including a cover member having a flat surface portion and a curved surface portion, a display panel having a liquid crystal layer and attached to the flat surface portion and the curved surface portion, and a first reinforcement film located on an opposite side of the display panel from the cover member and attached to the display panel, and in the display device, an edge of the first reinforcement film overlaps the liquid crystal layer.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a perspective view showing an example of the structure of a display device DSP according to the present embodiment. FIG. 1 shows a three-dimensional space defined by a first direction X, a second direction Y perpendicular to the first direction X, and a third direction Z perpendicular to the first direction X and the second direction Y. The first direction X and the second direction Y may intersect each other at an angle other than 90 degrees. In the present embodiment, the direction of an arrow indicating the third direction Z shown in the drawing is defined as above, and the opposite direction is defined as below.

In the present embodiment, the display device DSP is, for example, a liquid crystal display device including a liquid crystal layer. In the example illustrated, the display device DSP has a substantially rectangular shape and has edges EX1 and EX2 extending in the first direction X and edges EY1 and EY2 extending in the second direction Y. In the present embodiment, the display device DSP is curved near the edges EY1 and EY2. The display device DSP may be curved near the edges EX1 and EX2, may be curved only at one of the edges EX1, EX2, EY1 and EY2, or may be curved at three or more of the edges EX1, EX2, EY1 and EY2.

The display device DSP includes a display panel PNL, a cover member CG, an illumination device BL and a reinforcement film RF1.

The cover member CG has rigidity to the degree of maintaining the shape of the display panel PNL and is formed of a transparent material. The cover member CG is formed of glass, for example, but may be formed of resin, for example.

In the example illustrated, the cover member CG has curved surface portions C1a and C1b and a flat surface portion F1. The curved surface portions C1a and C1b are provided, for example, along the edges EY1 and EY2, respectively. The curved surface portions C1a and C1b are curved about an axis extending in the second direction Y toward the illumination device BL. In other words, the generatrixes of the curved surface portions C1a and C1b are parallel to the second direction Y. The flat surface portion F1 is parallel to an X-Y plane, for example. The flat surface portion F1 is located between the curved surface portion C1a and the curved surface portion C1b. In the example illustrated, the flat surface portion F1 and the curved surface portions C1a and C1b are located from the edge EX1 to the edge EX2.

The display panel PNL is located between the cover member CG and the illumination device BL and is attached to the cover member CG. The display panel PNL has flexibility and is arranged along the cover member CG. That is, the display panel PNL has the same shape as that of the cover member CG. More specifically, the display panel PNL has curved surface portions C2a and C2b attached to the curved surface portions C1a and C1b, respectively, and a flat surface portion F2 attached to the flat surface portion F1. In the example illustrated, the illumination device BL is also curved similarly to the cover member CG and the display panel PNL near the edges EY1 and EY2.

The display panel PNL is, for example, a transmissive type liquid crystal display panel which displays an image by selectively transmitting light from the illumination device BL. The display panel PNL may be a reflective type which displays an image by selectively reflecting external light or light from the illumination device BL or may be a transflective type which has both the display function of the transmissive type and the display function of the reflective type.

The display panel PNL has a display area DA and a non-display area NDA. The display area DA is an area which displays an image. The non-display area NDA is an area located outside the display area and having the shape of a frame which surrounds the display area DA. In the example illustrated, the display area DA is located in the flat surface portion F2 and a part of the display area DA is also located in the curved surface portions C2a and C2b.

The reinforcement film RF1 is located between the illumination device BL and the display panel PNL and is attached to the display panel PNL. In the present embodiment, the reinforcement film RF1 functions as a supporter which maintains the shape of the display panel PNL. The reinforcement film RF1 overlaps at least the entire display area DA. In the example illustrated, the reinforcement film RF1 contacts the flat surface portion F2 and a part of the reinforcement film RF1 also contacts the curved surface portions C2a and C2b.

FIG. 2 is a plan view showing an example of the structure of the display panel PNL and an example of the structure of the reinforcement film RF1 shown in FIG. 1. FIG. 2 shows a plane parallel to the X-Y plane defined by the first direction X and the second direction Y.

The display panel PNL includes a first substrate SUB1 and a second substrate SUB2. The first substrate SUB1 and the second substrate SUB2 are opposed to each other in the third direction Z. The first substrate SUB1 and the second substrate SUB2 are attached together by a sealant SE as shown by rising diagonal lines in the drawing. In the example illustrated, the sealant SE is provided in the shape of a ring along the outer periphery of the second substrate SUB2.

The second substrate SUB2 includes a light-shielding layer BM as shown by falling diagonal lines in the drawing. An area in which the diagonal lines intersect each other in the drawing corresponds to an area in which the sealant SE and the light-shielding layer BM overlap each other. The light-shielding layer BM is provided in the shape of a ring along the outer periphery of the second substrate SUB2 similarly to the sealant SE. In the example illustrated, the light-shielding layer BM overlaps the entire sealant SE and also extends on the inner side from the sealant SE. That is, an inner periphery IB of the light-shielding layer BM is surrounded by an inner periphery IS of the sealant SE. In the present embodiment, the display area DA corresponds to an area which is surrounded by the light-shielding layer BM, and the non-display area NDA corresponds to an area in which the light-shielding layer BM is arranged.

The first substrate SUB1 includes a mounting portion MT which extends beyond the second substrate SUB2 in the second direction Y. In the example illustrated, the mounting portion MT is provided along the edge EX1. The mounting portion MT includes a plurality of terminals TE which electrically connect the display panel PNL and an external device, etc. In the example illustrated, the terminals TE are located in the flat surface portion F2 in the mounting portion MT.

The display panel PNL includes a plurality of pixels PX in the display area DA. Here, the pixel PX corresponds to the minimum unit which can be controlled individually in accordance with a pixel signal, and includes a pixel electrode, a common electrode, a liquid crystal layer, a switching element, etc. In the example illustrated, the pixels PX are arranged in a matrix in the first direction X and the second direction Y.

The reinforcement film RF1 has the shape of, for example, a rectangle as shown by a thick broken line in the drawing. The reinforcement film RF1 is located in the entire display area DA and a part of the non-display area NDA. In the example illustrated, the reinforcement film RF1 overlaps the light-shielding layer BM but does not overlap the sealant SE. In other words, an outer periphery E1 of the reinforcement film RF1 is located between the inner periphery IS and the inner periphery IB. In the example illustrated, the outer periphery E1 is closer to the inner periphery IB than to the inner periphery IS.

The display panel PNL, the display area DA and the reinforcement film RF1 have the shape of a rectangle in the example illustrated but may have another shape. The display panel PNL, the display area DA and the reinforcement film RF1 may have a substantially rectangular shape having round corners, for example. Alternatively, the display panel PNL, the display area DA and the reinforcement film RF1 may have different shapes from each other.

Figure 3:
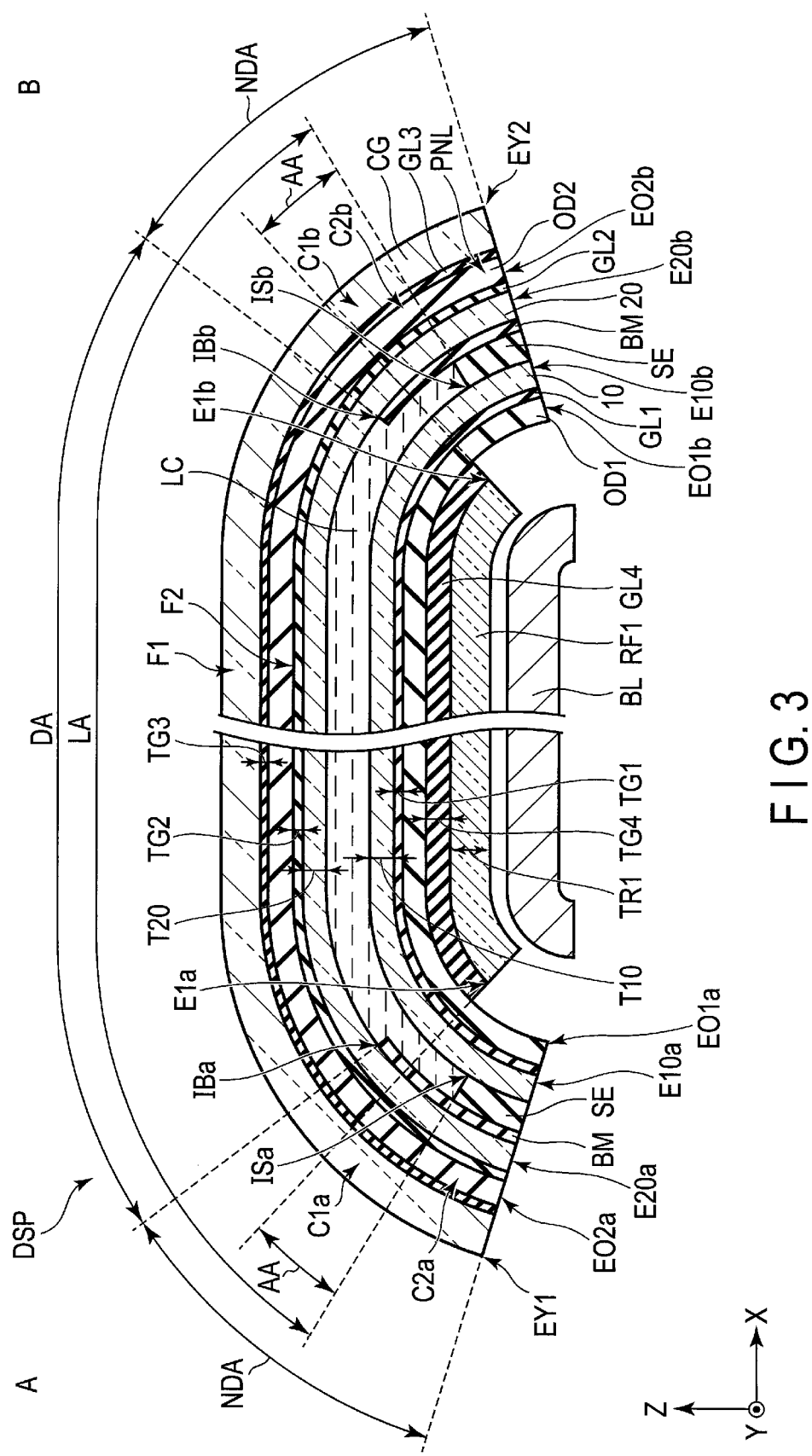
FIG. 3 is a sectional view taken along line A-B shown in FIG. 2.

FIG. 3 is a sectional view of the display device DSP taken along line A-B shown in FIG. 2. The display device DSP includes the display panel PNL, the cover member CG, the reinforcement film RF1 and the illumination device BL.

The display panel PNL includes basements 10 and 20, a liquid crystal layer LC, the sealant SE, the light-shielding layer BM, and optical elements OD1 and OD2. Here, only structures necessary for explanation are illustrated, and insulating layers, conductive layers, etc., are omitted. As will be described later in detail, the basement 10 constitutes the first substrate SUB1 shown in FIG. 2, and the basement 20 constitutes the second substrate SUB2 shown in FIG. 2. The basements 10 and 20 are formed of, for example, a flexible organic material such as polyimide.

The sealant SE, the light-shielding layer MB and the liquid crystal layer LC are located between the basement 10 and the basement 20. In the example illustrated, both the light-shielding layer BM and the sealant SE are located in the curved surface portions C2a and C2b. The light-shielding layer BM overlaps the entire sealant SE and also extends on the inner side from the sealant SE. Here, the "inner side" means a side closer to the center of the display area DA. The liquid crystal layer LC is located within an area sandwiched by the sealant SE. The liquid crystal layer LC is located in the flat surface portion F2 and a part of the liquid crystal layer LC is located in the curved surface portions C2a and C2b.

The optical element OD1 is located between the basement 10 and the illumination device BL and is attached to the basement 10. An adhesive layer GL1 is interposed between the optical element OD1 and the basement 10. The optical element OD2 is located between the basement 20 and the cover member CG and is attached to the basement 20. An adhesive layer GL2 is interposed between the optical element OD2 and the basement 20.

The optical elements OD1 and OD2 are polarizers, for example. Each of the optical elements OD1 and OD2 may be formed of a plurality of members. For example, the optical element OD1 may further include a member having a prism structure and have a function of condensing light from the illumination device BL to the display panel PNL side.

For example, the optical elements OD1 and OD2 have substantially the same size as that of the basement 20 shown in FIG. 2. In the example illustrated, the optical elements OD1 and OD2 are provided on the entire surfaces of the basement 10 and 20. Edges EO1a and EO1b of the optical element OD1 overlap edges E10a and E10b of the basement 10. Further, edges EO2a and EO2b of the optical element OD2 overlap edges E20a and E20b of the basement 20. Here, "to overlap" means to overlap in a direction orthogonal to a direction along the display surface. That is, "to overlap" means to overlap in the third direction Z in the flat surface portion F2 and means to overlap in the direction of the normal to the curved surface in the curved surface portions C2a and C2b as shown by broken lines in the drawing. The edges EO1a and EO1b do not necessarily overlap the edges E100a and E10b, and the edges EO2a and EO2b do not necessarily overlap the edges E20a and E20b.

The cover member CG is located on the opposite side of the display panel PNL from the illumination device BL. In the example illustrated, the cover member CG is attached to the optical element OD2. An adhesive layer GL3 is interposed between the optical element OD2 and the cover member CG.

The reinforcement film RF1 is located between the illumination device BL and the display panel PNL. The reinforcement film RF1 is attached to the display panel PNL but is separated from the illumination device BL. In the example illustrated, the reinforcement film RF1 is attached to the flat surface portion F2 and the curved surface portions C2a and C2b. In other words, the reinforcement film RF1 overlaps the flat surface portion F1 and the curved surface portions C1a and C1b of the cover member CG.

In the example illustrated, the reinforcement film RF1 is attached to the optical element OD1. An adhesive layer GL4 is interposed between the reinforcement film RF1 and the optical element OD1. In the present embodiment, the reinforcement film RF1 is located within an area in which the optical element OD1 is provided. That is, on the curved surface portion C2a side, an edge E1a of the reinforcement film RF1 is located on the inner side from the edge EO1a of the optical element OD1. Further, on the curved surface portion C2b side, an edge E1b of the reinforcement film RF1 is located on the inner side from the edge EO1b of the optical element OD1.

Further, the entire reinforcement film RF1 is located within a liquid crystal area LA in which the liquid crystal layer LC is provided. That is, the edges E1a and E1b overlap the liquid crystal layer LC. In other words, on the curved surface portion C2a side, the edge E1a is located on the inner side from an edge ISa of the sealant SE on the display area DA side. On the curved surface portion C2b side, the edge E1b is located on the inner side from an edge ISb of the sealant SE on the display area DA side. Still further, the edges E1a and E1b overlap the light-shielding layer BM as described above. On the curved surface portion C2a side, an edge IBa of the light-shielding layer BM on the display area DA side is located on the inner side from the edge E1a. On the curved surface portion C2b side, an edge IBb of the light-shielding layer BM on the display area DA side is located on the inner side from the edge E1b.

Here, the edge E1a corresponds to a part of the outer periphery E1 shown in FIG. 2 which extends along the edge EY1. The edge E1b corresponds to a part of the outer periphery E1 shown in FIG. 2 which extends along the edge EY2. The edges ISa and IBa correspond to parts of the inner peripheries IS and IB shown in FIG. 2 which extend along the edge EY1. The edges ISb and IBb correspond to parts of the inner peripheries IS and IB shown in FIG. 2 which extend along the edge EY2.

The reinforcement film RF1 is formed of, for example, a single member. The reinforcement film RF1 is formed of a transparent material which hardly absorbs but mostly transmits light from the illumination device BL. In the present embodiment, the reinforcement film RF1 has little impact on the optical properties of transmitted light. More specifically, the reinforcement film RF1 does not have a polarization axis and does not have an absorption function or a reflection function on a specific polarized light. Further, the reinforcement film RF1 does not make a phase difference to transmitted light. Still further, the reinforcement film RF1 does not have a prism structure, etc., and does not perform a light condensing function. Still further, the reinforcement film RF1 does not contain fine particles, etc., and does not perform a light diffusing function. This reinforcement film RF1 is formed of polyethylene terephthalate (PET), for example.

In the present embodiment, a thickness TR1 of the reinforcement film RF1 is greater than a thickness T10 of the basement 10 and a thickness T20 of the basement 20. Further, a thickness TG4 of the adhesive layer GL4 is greater than thicknesses TG1, TG2 and TG3 of the adhesive layers GL1, GL2 and GL3. Still further, in the example illustrated, the thickness TG4 is less than the thickness TR1 but is greater than or equal to the thicknesses T10 and T20. According to this structure, the level of contact between the reinforcement film RF1 and the basement 10 improves. Here, the "thickness" corresponds to, for example, a length in third direction Z in an area overlapping the flat surface portion F1.

The sealant SE has the function of fixing the position of the first substrate SUB1 and the position of the second substrate SUB2. Further, the reinforcement film RF1 has the function of preventing deformation of the first substrate SUB1. Therefore, an area AA between the sealant SE and the reinforcement film RF1 is more susceptible to a stress which is applied to the display panel PNL when the display panel PNL is attached to the cover member CG. In the example illustrated, the area AA corresponds to an area between the edge E1a and the edge ISa and an area between the edge E1b and the edge ISb.

Figure 4:
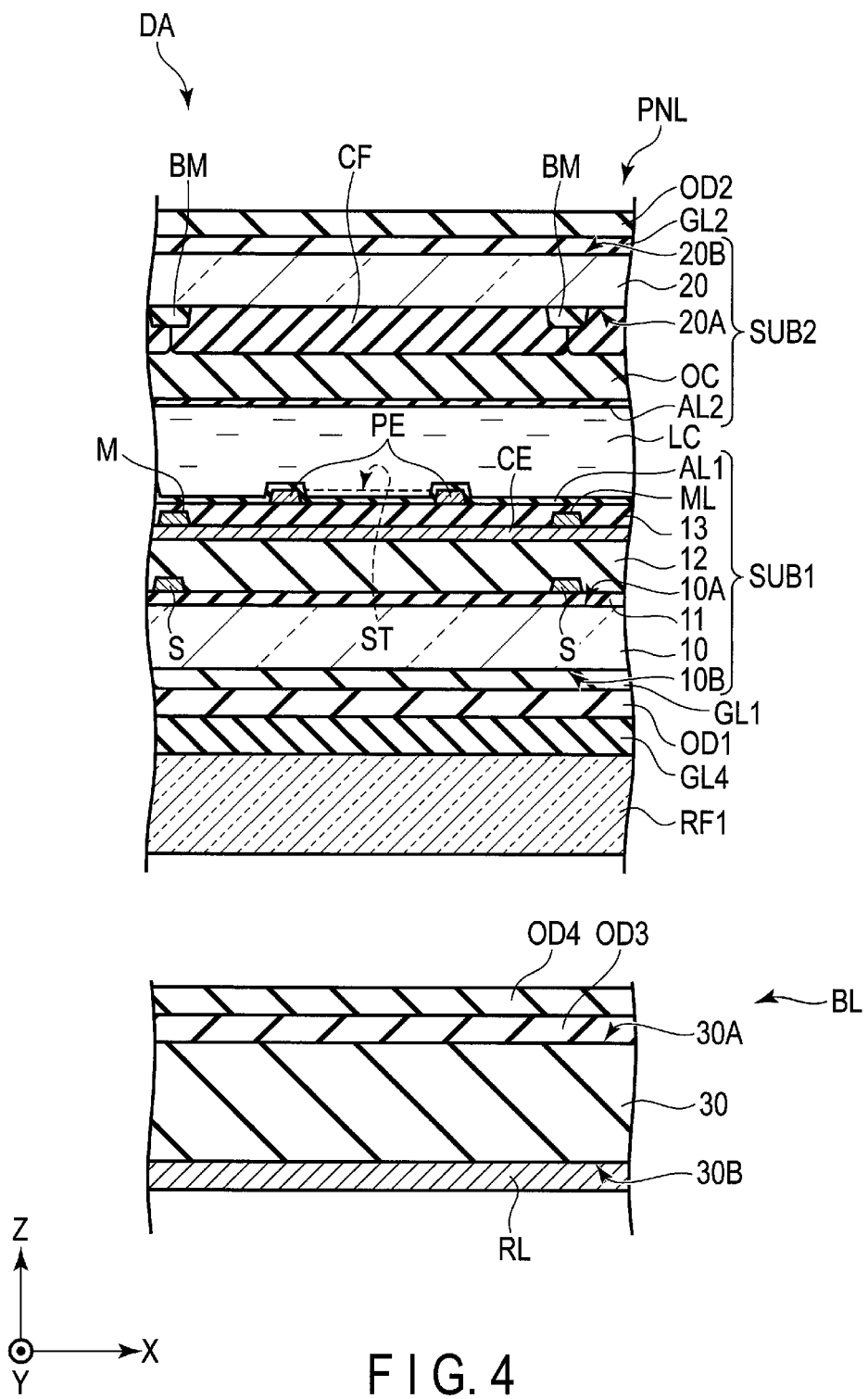
FIG. 4 is a sectional view showing an example of the structure of a display area DA shown in FIG. 2.

FIG. 4 is a sectional view showing an example of the structure of the display area DA shown in FIG. 2. FIG. 4 is a sectional view of the display device DSP taken in the third direction Z. The illustrated display panel PNL has a structure conforming to a display mode which mainly uses a lateral electric field substantially parallel to a substrate main surface. The substrate main surface here is a surface parallel to the X-Y plane.

The display panel PNL includes the first substrate SUB1, the second substrate SUB2 and the liquid crystal layer LC.

The first substrate SUB1 includes the basement 10, a signal line S, a common electrode CE, a metal layer ML, a pixel electrode PE, a first insulating layer 11, a second insulating layer 12, a third insulating layer 13, a first alignment film AL1, etc. The basement 10 has a first surface 10A opposed to the second substrate SUB2, and a second surface 10B opposite to the first surface 10A. Here, a switching element, a scanning line, various insulating layers interposed between them, etc., are not shown in the drawing.

The first insulating layer 11 is formed on the first surface 10A. The scanning line and a semiconductor layer of the switching element which are not shown in the drawing are located between the basement 10 and the first insulating layer 11. The signal line S is located on the first insulating layer 11. The second insulating layer 12 is located on the signal line S and the first insulating layer 11. The common electrode CE is located on the second insulating film 12. The metal layer ML contacts the common electrode CE directly above the signal line S. The metal layer ML is located on the common electrode CE in the example illustrated but may be located between the common electrode CE and the second insulating layer 12. The third insulating layer 13 is located on the common electrode CE and the metal layer ML. The pixel electrode PE is located on the third insulating layer 13. The pixel electrode PE is opposed to the common electrode CE via the third insulating layer 13. Further, the pixel electrode PE has a slit ST at a position opposed to the common electrode CE. The first alignment film AL1 covers the pixel electrode PE and the third insulating layer 13.

The scanning line, the signal line S and the metal layer ML are formed of a metal material such as molybdenum, tungsten, titanium or aluminum and may have a single layer structure or a multilayer structure. The common electrode CE and the pixel electrode PE are formed of a transparent conductive material such as ITO or IZO. The first insulating layer 11 and the third insulating layer 13 are inorganic insulating layers, and the second insulating layer 12 is an organic insulating layer.

The structure of the first substrate SUB1 is not limited to the example illustrated, and the pixel electrode PE may be located between the second insulating layer 12 and the third insulating layer 13 and the common electrode CE may be located between the third insulating layer 13 and the first alignment film AL1. In this case, the pixel electrode PE has the shape of a flat plate without a slit, and the common electrode CE has a slit opposed to the pixel electrode PE. Alternatively, both the pixel electrode PE and the common electrode CE may have the shape of a comb and may be arranged to be engaged with each other.

The second substrate SUB2 includes the basement 20, the light-shielding layer BM, color filters CF, an overcoat layer OC, a second alignment film AL2, etc. The basement 20 has a first surface 20A opposed to the first substrate SUB1, and a second surface 20B opposite to the first surface 20A.

The light-shielding layer BM and the color filter CF are located on the first surface 20A side of the basement 20. The light-shielding layer BM partitions the pixels PX. In the example illustrated, the light-shielding layer BM is located directly above the signal lines S. The color filters CF are opposed to the pixel electrodes PE and partially overlap the light-shielding layer BM. The color filters CF include a red color filter, a green color filter, a blue color filter, etc. The overcoat layer OC covers the color filters CF. The second alignment film AL2 covers the overcoat layer OC.

The color filters CF may be arranged in the first substrate SUB1 instead. The color filters CF may include color filters of four or more colors such as white. In the case of providing a pixel which displays white, a white color filter or an uncolored resin material may be arranged or the overcoat layer OC may be arranged without a color filter.

Further, the light-shielding layer BM may be arranged on the first substrate SUB1 side from the color filter CF. For example, the light-shielding layer BM may be located between the color filter CF and the overcoat layer OC or may be located between the overcoat layer OC and the second alignment film AL2. Still further, the light-shielding layer BM may be arranged in a plurality of layers.

The liquid crystal layer LC is held between the first substrate SUB1 and the second substrate SUB2. In the example illustrated, the liquid crystal layer LC contacts the first alignment film AL1 and the second alignment film AL2. The structures of the optical elements OD1 and OD2 are the same as those of the example shown in FIG. 3, and therefore detailed description thereof will be omitted.

The display panel PNL may have a structure conforming to a display mode which uses a longitudinal electric field perpendicular to the substrate main surface, may have a structure conforming to a display mode which uses an oblique electric field inclined with respect to the substrate main surface, or may have a structure conforming to a display mode which uses a combination thereof. In the display mode using the longitudinal electric field or the oblique electric field, the display panel PNL can adopt, for example, such a structure in which one of the pixel electrode PE and the common electrode CE is provided in the first substrate SUB1 and the other one of the pixel electrode PE and the common electrode CE is provided in the second substrate SUB2.

The illumination device BL includes a light guide 30, a reflective layer RL and optical elements OD3 and OD4. The light guide 30 has a first surface 30A opposed to the display panel PNL, and a second surface 30B opposite to the first surface 30A. The reflective layer RL is provided on the second surface 30B. The optical elements OD3 and OD4 are provided on the first surface 30A. The optical element OD3 is located between the light guide 30 and the optical element OD4. For example, the optical element OD3 contains fine particles, etc., and has the light diffusing function of diffusing light from the light guide 30. For example, the optical element OD4 has a prism structure and has the light condensing function of condensing light from the light guide 30 toward the display panel PNL. In the example illustrated, no adhesive layer is interposed between the light guide 30 and the optical element OD3 or between the optical element OD3 and the optical element OD4 in the display area DA.

The structure of the illumination device BL is not limited to the example illustrated. The illumination device BL may have one optical element or three or more optical elements.

According to the present embodiment, in the display device DSP including the cover member CG which has the curved surface portions C1a and C1b and the display panel PNL which is attached to the cover member CG and has the curved surface portions C2a and C2b, the reinforcement film RF1 is provided at least in the entire display area DA. The reinforcement film RF1 is sufficiently thick and is attached to the basement 10 side of the display panel PNL. Accordingly, even if the display panel PNL is curved along the cover member CG and is subjected to a stress, the display panel PNL will be prevented from being deformed into unintended form. For example, in an area in which the reinforcement film RF1 is provided, development of wrinkles in the basement 10 associated with the difference of curvature between the basement 10 and the basement 20 can be prevented. Therefore, unevenness of the thickness of the liquid crystal layer LC in the display area DA can be prevented, and degradation of the display quality can be prevented.

Further, the reinforcement film RF1 overlaps the light-shielding layer BM and the liquid crystal layer LC but does not overlap the sealant SE. According to this structure, even if wrinkles are developed in the basement 10 as the display panel PNL is curved, the positions of the wrinkles are controlled to be within the area AA. As a result, even if wrinkles are developed in the basement 10, impacts on display can be prevented.

FIG. 5 is a plan view showing another example of the display device DSP. The example shown in FIG. 5 differs from the example shown in FIG. 2 in that a part of the reinforcement film RF1 overlaps the sealant SE.

The sealant SE is located on the display area DA side from the outer periphery of the second substrate SUB2 at four corners CN1 of the second substrate SUB2. In the example illustrated, the sealant SE is rounded at the respective corners CN1. The outer periphery E1 of the reinforcement film RF1 partially overlaps the sealant SE at the respective corners CN1. That is, four corners CN2 of the reinforcement film RF1 overlap the sealant SE.

The same effect as that produced from the example shown in FIG. 2 can also be produced from the present example.

Figure 6:
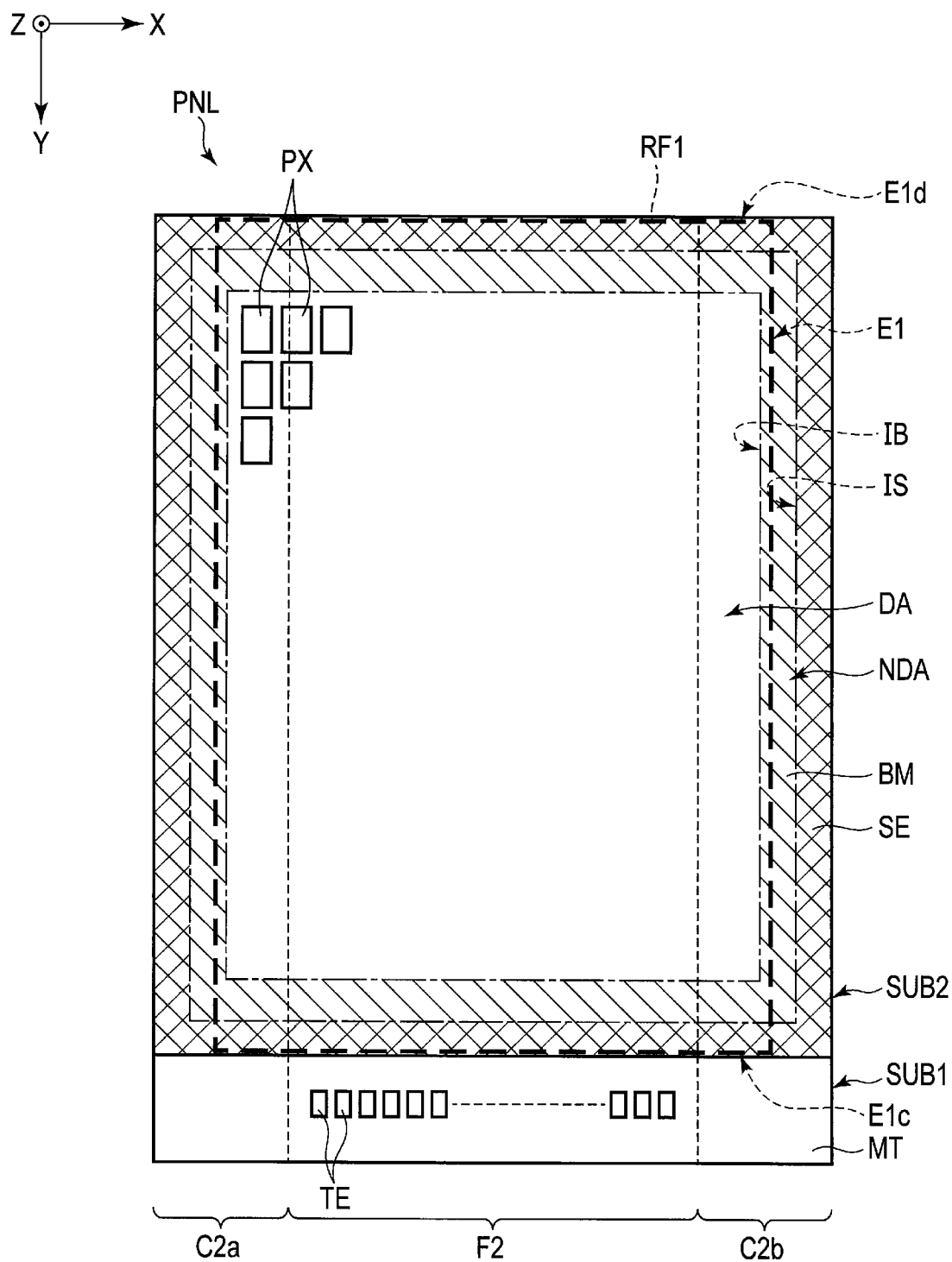
FIG. 6 is a plan view showing another example of the display device DSP.

FIG. 6 is a plan view showing another example of the display device DSP. The example shown in FIG. 6 differs from the example shown in FIG. 2 in that edges E1c and E1d of the reinforcement film RF1 which extend in the first direction X overlap the sealant SE. In the example illustrated, the length of the reinforcement film RF1 and the length of the second substrate SUB2 are substantially the same in the second direction Y. In a case where the curved surface portions C2a and C2b are curved about an axis extending in the second direction Y, the same effect as that produced from the example shown in FIG. 2 can also be produced from the present example.

FIG. 7 is a perspective view showing another example of the display device DSP. The example shown in FIG. 7 differs from the example shown in FIG. 1 in that the display area DA is located only in the flat surface portion F2. Accordingly, the reinforcement film RF1 only overlaps the flat surface portion F2.

Figure 8:
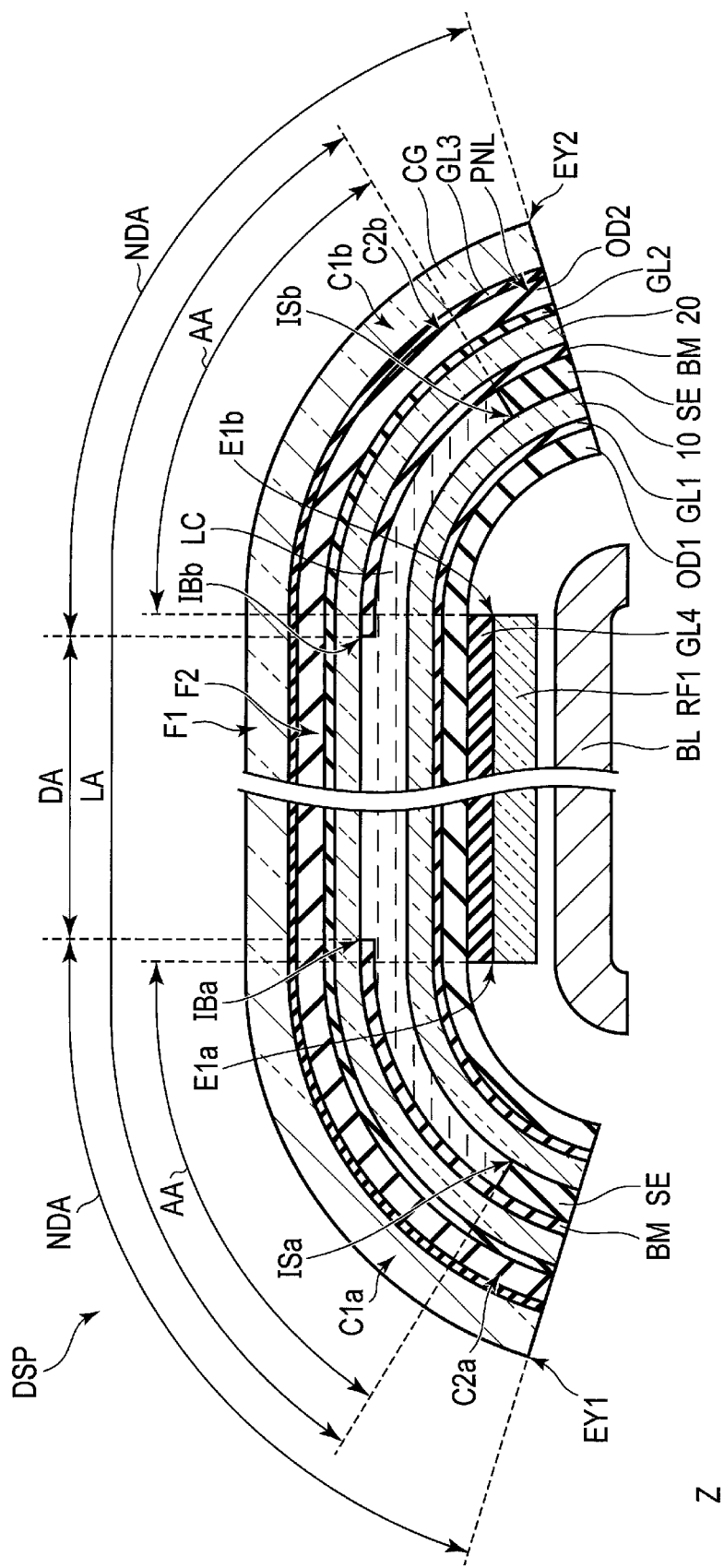
FIG. 8 is a sectional view of the display device of FIG. 7 taken in an X-Z plane.

FIG. 8 is a sectional view of the display device DSP shown in FIG. 7 which is parallel to the X-Z plane.

The sealant SE is located in the curved surface portions C2a and C2b. The light-shielding layer BM is located in the curved surface portions C2a and C2b and also extends to the flat surface portion F2. Accordingly, the display area DA is formed in the flat surface portion F2. The reinforcement film RF1 is only attached to the flat surface portion F2. In other words, the reinforcement film RF1 only overlaps the flat surface portion F1 of the cover member CG. Both of the edges E1a and E1b overlap the flat surface portions F2 and F1 and also overlap the light-shielding layer BM.

The same effect as that produced from the example shown in FIG. 3 can also be produced from the present example.

Figure 9:
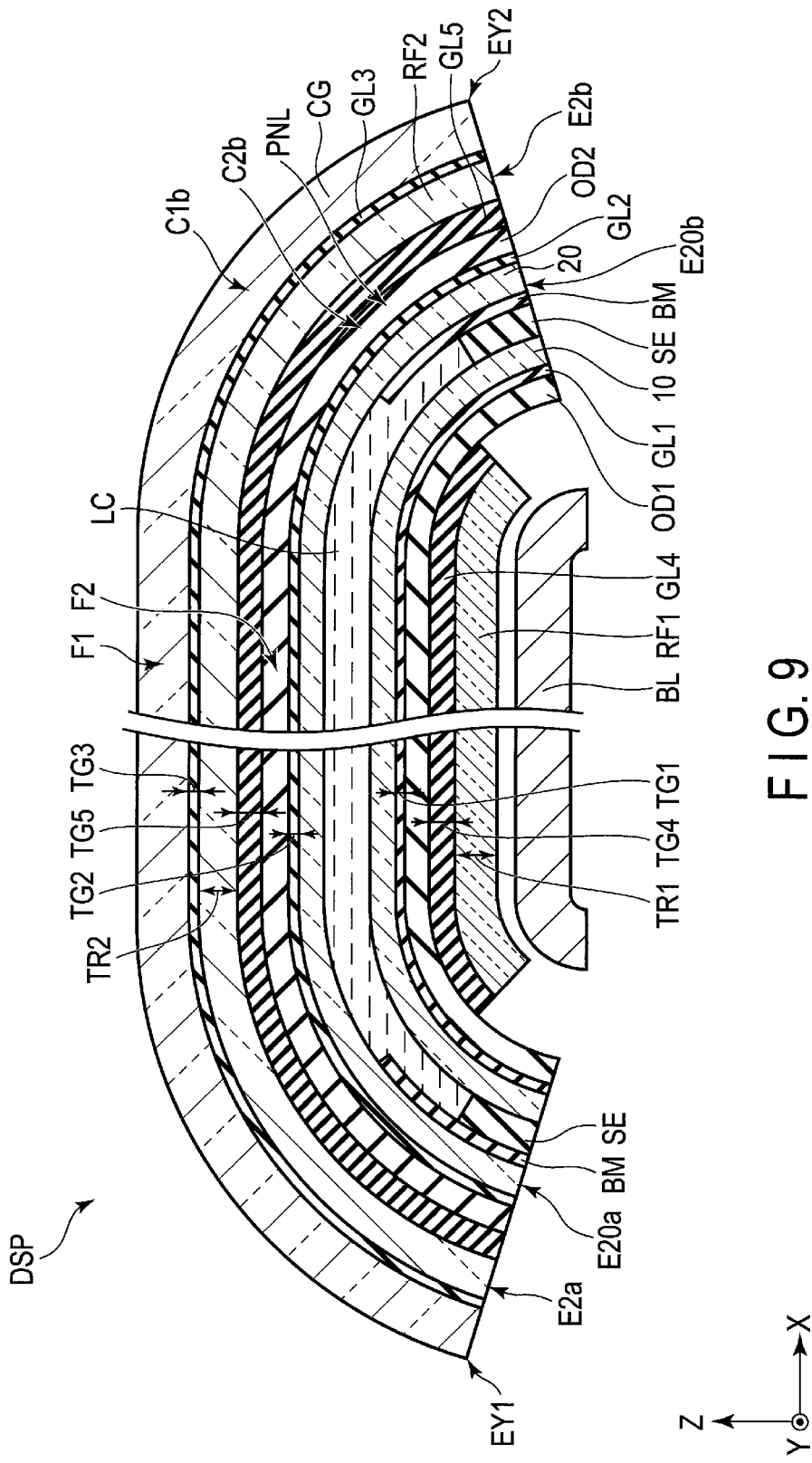
FIG. 9 is a sectional view showing another example of the display device DSP.

FIG. 9 is a sectional view showing another example of the display device DSP. The example shown in FIG. 9 differs from the example shown in FIG. 3 in that the display device DSP further includes a reinforcement film RF2.

The reinforcement film RF2 is located between and is attached to the cover member CG and the display panel PNL. In the example illustrated, the reinforcement film RF2 is attached to the optical element OD2. An adhesive layer GL5 is interposed between the reinforcement film RF2 and the optical element OD2. Further, the adhesive layer GL3 is interposed between the reinforcement film RF2 and the cover member CG.

The reinforcement film RF2 has the same structure as that of the reinforcement film RF1. A thickness TR2 of the reinforcement film RF2 is substantially the same as the thickness TR1, for example. The thickness TR2 may be different from the thickness TR1. A thickness GL5 of the adhesive layer GL5 is about the same as the thickness TG4 and is greater than the thicknesses TG1, TG2 and TG3, for example. The thickness TG5 may be different from the thickness TG4.

In the example illustrated, the reinforcement film RF2 overlaps the entire basement 20. That is, edges E2a and E2b of the reinforcement film RF2 are located on the outer side from the liquid crystal layer LC. For example, the shape and size of the reinforcement film RF2 are substantially the same as the shape and size of the second substrate SUB2 shown in FIG. 2. As described above, the reinforcement film RF1 does not overlap the sealant SE, whereas the reinforcement film RF2 overlaps the sealant SE. On the edge EY1 side, the edge E2a of the reinforcement film RF2 overlaps the edge E20a of the basement 20. Further, on the edge EY2 side, the edge E2b of the reinforcement film RF2 overlaps the edge E20b of the basement 20.

The same effect as that produced from the example shown in FIG. 3 can also be produced from the present structural example.

In the present embodiment, the basement 10 corresponds to the first basement, and the basement 20 corresponds to the second basement. The reinforcement film RF1 corresponds to the first reinforcement film, and the reinforcement film RF2 corresponds to the second reinforcement film. The optical element OD1 corresponds to the first optical element, and the optical element OD2 corresponds to the second optical element. The adhesive layer GL4 corresponds to the first adhesive layer, and the adhesive layer GL1 corresponds to the second adhesive layer. The thickness TG4 of the adhesive layer GL4 corresponds to the first thickness, and the thickness TG1 of the adhesive layer GL1 corresponds to the second thickness. Further, the adhesive layer GL5 corresponds to the third adhesive layer, and the adhesive layer GL2 corresponds to the fourth adhesive layer. The thickness TG5 of the adhesive layer GL5 corresponds to the third thickness, and the thickness TG2 of the adhesive layer GL2 corresponds to the fourth thickness.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first basement having flexibility;
   a second basement having flexibility and opposed to the first basement;
   a sealant which attaches the first basement and the second basement to each other;
   a light-shielding layer located between the first basement and the second basement and overlapping the sealant; and a first reinforcement film provided on an opposite side to a side of the first basement which is opposed to the second basement, wherein an edge of the first reinforcement film is located on an inner side from an edge of the sealant in a plane view, and the edge of the first reinforcement film overlaps the light-shielding layer.

2. The display device of claim 1, wherein the edge of the first reinforcement film is located between the edge of the sealant and an edge of the light-shielding layer.

3. The display device of claim 1, further comprising:
a first optical element located between the first reinforcement film and the first basement;
a first adhesive layer provided between the first optical element and the first reinforcement film; and
a second adhesive layer provided between the first optical element and the first basement, wherein
a first thickness of the first adhesive layer is greater than a second thickness of the second adhesive layer.

4. The display device of claim 1, further comprising a second reinforcement film provided on an opposite side to a side of the second basement which is opposed to the first basement.

5. The display device of claim 4, wherein the second reinforcement film overlaps the entire second basement.

6. The display device of claim 4, further comprising:
a second optical element located between the second reinforcement film and the second basement;
a third adhesive layer provided between the second optical element and the second reinforcement film; and
a fourth adhesive layer provided between the second optical element and the second basement, wherein
a third thickness of the third adhesive layer is greater than a fourth thickness of the fourth adhesive layer.

7. The display device of claim 4, further comprising a cover member having a flat surface portion and a curved surface portion, wherein
the second basement overlaps the flat surface portion and the curved surface portion.

8. The display device of claim 1, further comprising a cover member having a flat surface portion and a curved surface portion, wherein
the first basement is opposed to the flat surface portion and the curved surface portion, and
the first reinforcement film overlaps the flat surface portion.

9. The display device of claim 8, wherein the first reinforcement film overlaps the curved surface portion.

10. The display device of claim 1, further comprising a cover member having a flat surface portion and a curved surface portion, wherein
the first basement is opposed to the flat surface portion and the curved surface portion, and
an edge of the light-shielding layer and the first reinforcement film overlap the flat surface portion.

11. The display device of claim 1, further comprising a cover member having a flat surface portion and a curved surface portion, wherein
the first basement is opposed to the flat surface portion and the curved surface portion, and
an edge of the light-shielding layer and the first reinforcement film overlap the curved surface portion.

12. The display device of claim 1, wherein a thickness of the reinforcement film is greater than a thickness of the first basement.

13. A display device comprising:
a cover member having a flat surface portion and a curved surface portion;
a display panel having a liquid crystal layer and attached to the flat surface portion and the curved surface portion;
a first reinforcement film located on an opposite side of the display panel from the cover member and attached to the display panel; and
a second reinforcement film located between the cover member and the display panel and attached to the display panel, wherein
an edge of the first reinforcement film overlaps the liquid crystal layer, and
the second reinforcement film overlaps the entire display panel.

* * * * *